10μ

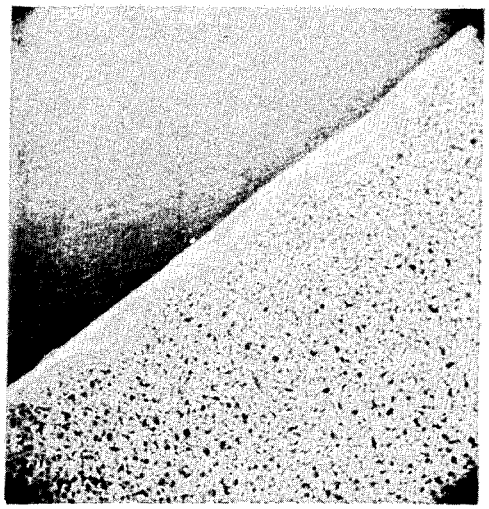
FIG. 1
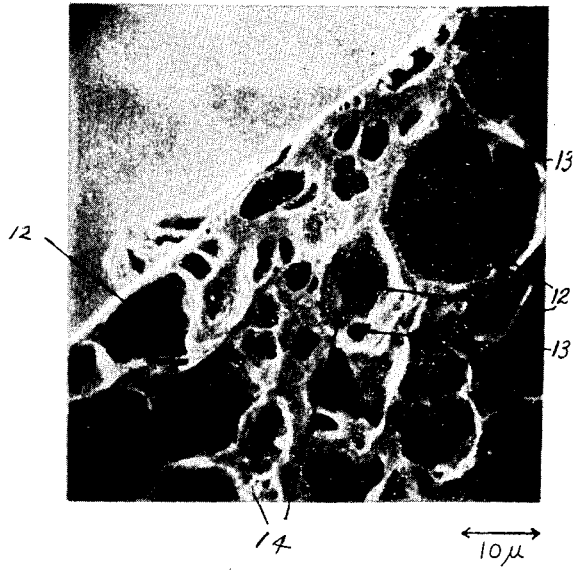
FIG. 2
FIG. 3
FIG. 4
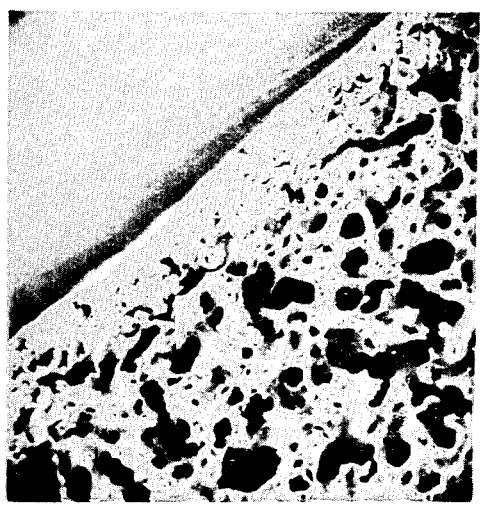

3,763,301
PROCESS FOR DENSIFYING A MICROPOROUS ELASTOMERIC POLYURETHANE SHEET MATERIAL
Frank P. Civardi, Wayne, N.J., and Charles J. Lattarulo, White Plains, N.Y., assignors to Immont Corporation, New York, N.Y.
Continuation of application Ser. No. 782,096, Dec. 9, 1968. This application Aug. 4, 1970, Ser. No. 60,930
Int. Cl. B29c *15/00, 27/04*
U.S. Cl. 264—321
24 Claims

ABSTRACT OF THE DISCLOSURE

Process for selectively densifying a microporous elastomeric polyurethane sheet material by wetting the sheet with water and pressing it against a hot surface. The microporous elastomeric polyurethane sheet material is wetted with water and then selectively or completely compressed at a temperature well below the "collapse temperature" of the sheet until the sheet is locally or completely densified and then the sheet is dried. The final product is useful in making shoe uppers.

---

Figure 5:
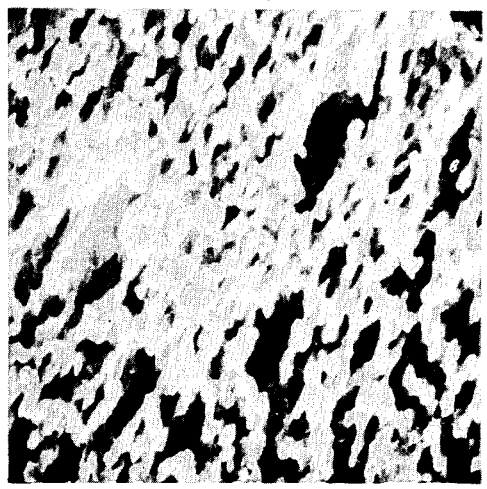

This is a continuation of application Ser. No. 782,096, filed Dec. 9, 1968.

Microporous leather substitutes, comprising a fibrous base such as a relatively thick woven or non-woven fabric impregnated with, and coated with a much thinner layer of microporous polymer such as a polyurethane, are well known in the art and sheets of such products have been used extensively for replacements for leather in men's (and women's) shoe uppers. For men's shoe uppers the suitable thickness of the sheet material is about 60–70 mils (about 1.5–1.8 mm.) while for women's shoe uppers the suitable thickness is about 30–45 mils (about .8–1.1 mm.); most of this thickness, in each case, is occupied by the fibrous fabric and the microporous polyurethane layer above the fabric is relatively thin (e.g. about 0.25–0.4 mm. in thickness).

Another type of leather substitute, useful for making improved shoe upper materials, as well as other articles, is a microporous sheet material which does not have its extensibility constrained by the presence of a reinforcing fabric such as a woven or non-woven fibrous fabric. Throughout its thickness it consists essentially of non-fibrous elastomeric polyurethane material. Unlike the conventional leather substitutes which have ultimate elongations of some 20–40%, it can be stretched well over 50% (e.g. well over 100% and usually well over 200%).

In accordance with one aspect of this invention a microporous elastomeric polyurethane sheet is wetted with a liquid aqueous medium and then compressed, across substantially the entire area of the sheet, in contact with a hot surface.

In one embodiment the polyurethane sheet is saturated with water and then passed between a lower roll (which may be unheated and have a resilient surface, e.g. of rubber) and an upper heated metallic roll to produce a limited densification of the upper portion of the microporous polyurethane sheet, thus improving the properties of the sheet material (e.g. its scuff resistance), its gouge resistance, and its "break" when folded, while retaining its ability to transmit water vapor at a high rate. When a dyed or pigmented polyurethane sheet is used the upper surface of the sheet is much more deeply colored than before the treatment, and dyeing imperfections are less noticeable. When the sheet used in the process varies in thickness the product is appreciably more uniform in thickness.

In one preferred form of the invention the wet sheet material is preheated prior to undergoing the limited densification described above. Such preheating may be effected for instance by a preliminary passage of the sheet through a nip in contact with a heated roll or by having the sheet travel along the surface of a heated roll (which may be a hot rotating "drum" of relatively large diameter).

Instead of using rolls to apply the heat and pressure one may employ a press, such as a Sheridan press, having at least one heated surface (e.g. a heated plate) against which the microporous material is pressed for a period of time (e.g. some 30 to 300 seconds).

In one form of the invention the microporous material being treated comprises a more dense base layer (e.g. of apparent density about 0.4 to 0.5 g./cm.$^3$, and about 0.6 to 1.6 mm. thick) and a less dense upper layer (e.g. of apparent density about 0.3 to 0.4 g./cm.$^3$ and about 0.1 or 0.2 to .5 mm. thick). By the treatment of this invention the upper layer can be selectively densified, with little or no change in the thickness or density of the base layer.

The process can be used to emboss the microporous sheet with an overall grain pattern. Thus, the surface of the heated metallic roll or plate may have a fine raised pattern to give an effect simulating kid grain leather. The use of the aqueous medium makes it possible to obtain a very clear and sharp grain pattern and to do this at a temperature very much lower than the temperature required for embossing the dry material. Other grain patterns may be obtained by the use of rolls or plates having intaglio surfaces.

The process may also be used to give the microporous polyurethane sheet a very fine permanent grain without the need for using a grain roll or plate. Thus after the upper portion of the sheet has been densified the hot wet sheet may be folded, with the densified surface on the inside of the fold, and pressure may be applied to the fold while the fold is moved along the material, e.g. in a manner similar to that used in "boarding" leather. The upper densified surface carries a very fine permanent grain similar to the grain of boarded calfskin.

In another embodiment the aqueous medium is applied only to localized areas of the microporous sheet before the pressure is applied. The densification, distinct pattern and the deep color appear only in the areas which were wetted. Furthermore even though these areas were originally of substantially the same thickness as the unwetted portions of the sheet they are now depressed considerably, e.g. 0.01 to 0.25 mm. below the level of the unwetted areas. Even when plain water is used as the wetting medium, and even when a wetting agent is added to the water to improve its penetration into the thickness of the microporous material, the boundaries between these depressed areas and the adjacent areas are quite sharp, despite the fact that a substantially uniform compacting pressure is applied across substantially the entire area of the sheet.

The selective application of the water to localized areas of the microporous material can be effected by screen printing, gravure or intaglio printing or other printing techniques, and the heated roll or plate can have a smooth unpatterned surface. To reduce undesired spreading of the water, beyond the predetermined desired boundaries on the surface used for applying the water, as well as to reduce spreading of the water on the microporous material, the water may be blended with a thickening agent. The thickening agent may be a polymeric water-soluble material such as a cellulose derivative or vinyl polymer (e.g. methyl cellulose, carboxymethyl cellulose, ammoniated ethylene-maleic anhydride copolymer, such as the products known as Methocel or Carbopol). Other thickening agents such as a dispersed oil phase, e.g. xylene, in the presence of a suitable dispersing agent therefor, may also be used. An emulsified polymer (e.g. a latex of ammoniated acrylate-unsaturated carboxylic acid (e.g. itaconic acid) copolymer, such as Acrysol ASE–60) can also act to thicken the medium. The amount of thickening agent (e.g. 0.1 to 5%) may be such as to raise the viscosity of the aqueous medium to about 2000 to 20,000 centipoises.

As previously mentioned, a wetting agent may also be present in the aqueous medium. Examples of such materials are anionic, nonionic and cationic surfactants, such as long chain hydrocarbon sulfates or sulfonates, e.g. sodium lauryl sulfate, or long chain hydrocarbon radicals attached to polyethylene oxide radicals, such as nonylphenol poly(ethyleneoxy) ethanol (e.g. Igepal C0730). The concentration of wetting agent is generally within the range of about 0.2 to 1% or 2%.

The water may also carry a coloring agent, which may be a dye, pigment or other effect material. Thus, water-soluble or water-dispersible dyes may be employed. Examples of pigments and other effect materials are phthalocyanine blue, benzidene yellow, phthalocyamine green, and mercadium red. These materials may be used in concentrations of about 0.1 to 10%, e.g. 0.5–2%.

Special effects may be produced by printing on the upper surface of the microporous material with a series of different aqueous compositions in different patterns before the hot pressing operation. For instance, the microporous material may be dyed red with an aqueous or organic solvent solution of red dye, dried and then printed on its upper surface in two different patterns with two different colored (e.g. blue and red) aqueous dye solutions; then while the sheet is still wet with the aqueous media in the printed areas its upper surface is pressed against a hot grained metal plate to produce a sheet in which the printed areas have a deeper color and a heavier, deeper grain than the unprinted areas. Another special effect can be obtained by first applying a hydrophobic material in a pattern to selected areas of the surface of the sheet. For instance an aqueous silicone dispersion (e.g. Dow Corning 36), preferably after suitable thickening of the dispersion, may be printed in a pattern onto the microporous sheet and then dried. The surface of the sheet is wetted with water, but the silicone-printed areas remain dry, and the wetted sheet is then compressed between the grained rolls or plates described above to produce a sheet having a grained, compressed surface at the wetted areas and a relatively uncompressed and grainless surface at the silicone-containing areas.

This invention is particularly useful for the treatment of microporous sheets whose density is in the range of about 0.35 to 0.65 g./cm.$^3$, more preferably at least about 0.4 g./cm.$^3$, e.g. 0.4 to 0.5 g./cm.$^3$, and which are substantially free of macropores.

One skilled in the art, knowing the effects attainable by the use of the process of this invention, as described herein, will have no difficulty in determining the particular process conditions for best results. Illustrations of trials to determine the conditions suitable for any given effects are illustrated in the examples. The degree of pressure, time of treatment, and temperature are somewhat interdependent. For commercial operations using rolls to apply the pressure to moving sheets of the material the time of exposure to the pressure and heat will generally be below 3 seconds, and much shorter exposure times may be employed. The temperature should of course not be so high that the polyurethane sheet sticks to the hot surface. Generally the temperature of the hot surface will be well below the "collapse temperature" of the sheet (that is, the temperature at which the sheet loses its porous structure, a phenomenon which is evidenced by the dry sheet becoming translucent or transparent); excellent results have been obtained at temperatures more than 20° C. below the collapse temperature, e.g. 40, 50 or 70° C. below the collapse temperature. It has been found that when the duration of the application of pressure is lengthened, lower temperatures (e.g. some 90° C. or more below the collapse temperature) may be used. Temperatures well above the boiling point of water may be used (with materials that do not collapse at such temperature) resulting in the generation of steam within the microporous structure.

The pressure employed is often sufficient to squeeze out substantially all the excess water (that is, an increase in pressure, such as caused by doubling the force with which the material is compressed does not result in a substantial decrease in the water remaining in the compressed structure). In one procedure, the pressure is such that the thickness of the sheet at the time the pressure is being applied to it is about ½, or less than ½, its original thickness.

It is often convenient to apply the heat and pressure in two stages: a first stage in which excess water is squeezed out and the wet sheet is heated as by contact with a hot pressure-applying surface; and a second stage in which the wet material is selectively densified to the desired extent.

By suitable control, the zone of densification may extend to an appreciable depth (e.g. 0.2 or 0.3 mm. of the densified final product), with the material being substantially uniformly densified in this zone, e.g. to a density in the range of 0.6 to 0.9 or 1.0 g./cm.$^3$; to this end one may use relatively long times and high pressures with thorough preheating and lower temperatures of the heating surface so that there is a low temperature gradient through the zone to be densified. Also one may effect a densification extending to a similar depth but with the density decreasing gradually with depth.

In one preferred form, the product is a microporous sheet 1.5 mm. in thickness having an upper zone whose average density over a depth (measured from the top) of about 0.3 mm. is about 0.6 g./cm.$^3$ and whose average density over a depth (again measured from the top) of about 0.1 mm. is about 0.8 g./cm.$^3$, and having a lower zone whose average density is about 0.47 g./cm.$^3$ over a depth (measured from the bottom) of 1.2 mm.; in that portion of the upper zone which is furtherest from the top surface (e.g. the portion at a depth of about 0.25–0.3 mm. from the top) the density may be relatively low (e.g. 0.37 g./cm.$^3$) although the sheet need not contain such a low density zone.

The present invention has thus far found its greatest usefulness in the making of shoe upper materials from sheets which throughout their thickness consist essentially of non-fibrous elastomeric polyurethane material which does not have its extensibility constrained by the presence of a reinforcing fabric. These shoe upper sheets have thicknesses of at least 25 mils (0.63 mm.), e.g. about 30 to 100 mils (about 0.75 to 2.5 mm.) and preferably about 30 to 70 mils (about 0.76 to 1.8 mm.), e.g. about 0.8 to 1.1 mm. for women's shoe uppers and about 1.5 to 1.8 mm. for men's shoe uppers.

The microporous materials used in the process of this invention have pores invisible to the naked eye of a person with 20/20 vision. Such pores measure less than 100 microns in their maximum dimension (when a plane surface, such as the top or bottom of the material or a cross-section thereof is observed). As will be seen hereafter, the pores generally measure well below 50 microns in their maximum dimension.

The accompanying drawings show photomicrographs of various microporous materials used, or produced, in the practice of this invention. These photomicrographs were obtained with a scanning type electron microscope (Type JSM, Japan Electron Optics Laboratory Co., Ltd.), viewing cross-sections of the sheet material (obtained by cutting through the thickness of the sheet with a razor). In preparation for viewing, the cut sheet material is given a very thin uniform metallic (gold-palladium) coating about 300 angstroms in thickness; the coating may be applied by evaporating the metal onto the specimen in a high vacuum (e.g. 10⁻⁴ mm. Hg absolute), the specimen being rocked while metal deposition is occurring, so as to distribute the metal uniformly over the surface, including the crevices, of the specimen. This coating serves to conduct away the electron charge which would otherwise accumulate on the surface of the specimen when it is exposed to the electron beam in the scanning electron microscope. The approximate scale is indicated for each photomicrograph. In viewing the photomicrographs it should be borne in mind that the scanning type electron microscope has a great depth of focus (nearly 300 times that of the light microscope) such as about 300 microns at 100× magnification or 100 microns at 1000× magnification, enabling one to, in effect, see into the interiors of the pores.

The invention has thus far found its greatest utility in the treatment of a microporous sheet having a structure as illustrated in FIG. 2 in which the pore system comprises cavities 12 having their maximum dimensions in the range of up to about 45 microns, connected by passages 13 which may have much smaller dimensions (e.g. maximum dimensions apparently as low as about ½ micron). The walls of the cavities may be very thin, such as the wall seen between the two cavities at the upper right of FIG. 2, which appears to have a thickness which is within the range of about 1 to 10 microns; it will be understood that other walls present in FIG. 4 are seen broadside, or at an angle, so that their thinness is not readily apparent. Fine cavities 14 may also be present in the walls of the irregular cavities 12. One suitable method for making such a structure is by forming, as on a temporary support, a thick layer of a mixture of a leachable material (such as microscopic sodium chloride particles) and a solution of the thermoplastic polyurethane in a solvent (e.g. dimethylformamide) and treating the layer on the support with a liquid coagulant-leaching agent (e.g. water) which is a non-solvent for the polyurethane and at least partially miscible with the solvent, so as to coagulate the polyurethane into a microporous sheet; the treatment with the coagulant is continued until substantially all the solvent and leachable material are removed; the resulting water vapor-permeable flexible sheet material is dried and stripped from the temporary support.

Another type of microporous sheet which may be treated in accordance with this invention has a structure in which the pore system is substantially free of the larger cavities 12 seen in FIG 2, but instead includes a multitude of fine interconnected pores of considerably smaller size. One technique for making such a product uses a mixture comprising the thermoplastic elastomeric polyurethane uniformly distributed in a blend of a volatile solvent and a miscible less volatile nonsolvent. In a preferred version of this technique a clear hot solution of the polyurethane in the solvent-nonsolvent blend is cooled until a cloudy colloidal dispersion of the polyurethane is formed; this cloudy dispersion is cast as a thick layer onto the temporary support and the solvent and nonsolvent are evaporated, and the sheet is removed from the support.

Microporous sheets which may be treated in accordance with the present invention may be made by other techniques. Thus, other coagulating methods may be used to treat the thick layer of the mixture of polyurethane solution and leachable material. Among such coagulating methods are cooling the mixture (e.g. −78° C.), or subjecting the mixture to vapors of non-solvent (e.g. to a humid atmosphere), or simply evaporating the solvent, preferably at a rate slow enough to avoid the formation of macroporous bubbles or holes in the sheet, or using various combinations of these coagulating methods (e.g. freeze drying techniques) before removal of the leachable material (e.g. NaCl) or other microscopic particulate material. In place of, or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution and which can either be dissolved out by treating the coagulated sheet with water or other suitable solvent for the particle which is a non-solvent for the polyurethane or can be otherwise destroyed or removed; examples of such particles are sodium carbonate, oxalic acid, ammonium carbonate, or suitable microballoons. Alternatively, the void-forming particulate material may be in the form of dispersed microscopic droplets of a liquid insoluble in the solution of polyurethane or in the form of dispersed microscopic bubbles of gas. The particle size of the microscopic particulate material is well below 100 microns, preferably less than 50 microns and greater than about one micron, more preferably in the range of about 3 to 20 microns. The ratio of the total volume of the microscopic particulate void forming material and the total volume of polyurethane in solution may be for instance, in the range of about 0.5:1 to 5:1, preferably in the range of about 1:1 to 3:1, thus 178 grams of the sodium chloride particles may be mixed with 333 grams of a 30% solution of the polyurethane in dimethylformamide, giving a volumetric salt:polymer ratio of 1:1.

It is also within the broad scope of this invention to employ microporous materials made by a process in which fine particles of the polyurethane, with or without a particulate void-forming material (such as any of the microscopic particulate materials previously mentioned) are fused together at their points of contact as by means of heat alone or heat in the presence of a solvent or swelling agent for the polymer which solvent or swelling agent may be distributed over the surfaces of the polymer particles, followed, when desired, by removal of any of the void forming particulate that may be present.

The solid polymeric material of the microporous sheets treated in accordance with this invention is a thermoplatic elastomeric polyurethane material having an intrinsic viscosity of above 0.6, preferably above 0.8, and more preferably about 1 or more. The polyurethane is composed of segments having urethane linkages and intermediate longer segments which may for example be of polyester or polyether character. The urethane linkages are preferably derived from aromatic diisocyanates, such as diphenyl methane-p,p'-diisocyanate, and are thought to provide so-called "hard' segments in the polymer molecule, while the other segments (e.g. the polyester or polyether segments) are flexible or "soft." Polyurethanes of this type are known in the art. They may be made, for instance, by reacting a relatively low molecular weight hydroxyl-terminated polyester or polyether (e.g. of molecular weight below 6000 and preferably between 800 and 2500) with a low molecular weight glycol and a diisocyanate.

In making the polyurethane one may employ a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length.

Typical polyethers which are used to provide the soft segments for elastomeric polyurethanes are usually of aliphatic character. One type has the formula $H(RO)_nH$ where R is a divalent alkylene radical, such as tetramethylene or ethylene or propylene, and $n$ denotes the degree of polymerization.

The preferred diisocyanate is diphenyl methane-p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate.

The low molecular weight glycol referred to above acts as a chain extender. The preferred chain extender is tetramethylene glycol, but other chain extenders may be used as such or in admixture therewith. Examples of such other difunctional chain extenders are other dihydric alcohols such as ethylene glycol, hydroxy amines such as 2-aminoethanol, diamines such as ethylene diamine, or water. The amount of chain extender is preferably such as to produce a thermoplastic product of high intrinsic viscosity.

In the preferred class of polyester polyurethanes made with diphenylmethane-p,p'-diisocyanate, those having nitrogen contents in the range of 4 to 5%, most preferably in the neighborhood of 4½% (e.g. 4.4–4.6%) have been found to be particularly suitable.

The polyurethane material should have a melting point of at least 100° C. preferably above 150° C. (e.g. about 170 to 2000° C. (as measured by differential thermal analysis or differential scanning calorimetry). When formed into a smoth void-free thin film, 0.2–0.4 mm. in thickness it should have the properties described below; such thin films can be formed by careful casting of solutions of the polymer (e.g. a degassed 30% solution in dimethylformamide) followed by careful evaporation of the solvent in a dry atmosphere: a tensile strength of at least 210 kilograms per square centimeter (preferably at least 350, e.g. about 420 to 560), a percent elongation at break of at least 300% (preferably at least 400%, e.g. about 500 to 700%), an elastic modulus of at least 105 kilograms per square centimeter (preferably at least 350 e.g. about 560 to 770), a 100% secant modulus (stress divided by strain at 100% elongation) of at least 20 kilograms per square centimeter (preferably at least 84, e.g. about 110 to 134). These mechanical properties are measured by ASTM D882–67.

The polyurethane (again, tested as a thin film made as described above), should recover completely from a 5% elongation at room temperature (23° C.) but preferably does take on a permanent set (one measured for example as in an ASTM D412–66) after a 100% elongation. This set is usually within the range of about 5 to 20%; for the best materials thus far employed it is in the range of about 10 to 20%, e.g. about 15%. A typical material shows a tension set of some 24–26% immediately on release of the clamps after being held at the 100% elongation for 10 minutes while the "permanent set," which is here taken as the tension set measured 1 hour after the release of the clamps, is 14% (measured on a film specimen 1 cm. wide with a gage length of 5 cm. and a strain rate, for the 100% elongation, of 254% per minute). Preferably the material has a Shore hardness of at least 75A (more preferably about 90A to 60D), measured by ASTM D1706–67.

The polyurethane material may be composed of polyurethane per se. It is also within the broad scope of the invention to use polyurethane materials which are blends of polyurethanes and other high polymers such as a vinyl chloride polymer (e.g. the vinyl chloride copolymers known as Bakelite VYHH or VAGH, containing vinyl acetate as a comonomer) or a rubbery copolymer of a conjugated diolefin and acrylonitrile (e.g. the butadiene-acrylonitrile copolymer known as Hycar 1031). The amount of such other high polymer is generally below 40% (e.g. 10% or 20%) of the total weight of the blend.

Both before and after the treatment of this invention the unreinforced microporous sheet material preferably has a percent elongation at break of about 50% (e.g. above 100%, such as in the range of about 300 to 400% or more); a tensile strength above 35 kg./cm.$^2$, and a slit tear strength (ASTM D2212–64) above 1 kg. mm. thickness (e.g. in the range of about 2 to 5. Both before and after the treatment it should permit the passage of water vapor (thus its water vapor transmission should be at least 200 g./m.$^2$/24hrs. measured as in ASTM E96–66, procedure B). Also, it is desirable that at least the upper surface of the sheet, after suitable finishing, if desired, be resistant to the passage of liquid water, e.g. the finished sheet should have a hydrostatic head (British Standard 2823) of above 100 mm. Hg.

As indicated previously in a preferred process for making the microporous sheet material, water is used to leach out finely powdered sodium chloride or other particulate pore-forming material. The treatment of this invention may be carried out directly on the resulting water-soaked sheet. Alternatively the sheet may be dried and given another finishing treatment before treating it in accordance with this invention. Thus, the treatment of this invention may follow directly a dyeing treatment in which the sheet may be soaked in a solution of a solvent dye (such as an "Irgacet" dye which may be of the type described in U.S. Pat. 2,551,056, most usually a black or brown dye, dissolved in methanol), followed by evaporation of the solvent. Or the treatment of a dyed or undyed sheet in accordance with this invention may follow or (more preferably) precede a treatment of the upper surface of the sheet with fine droplets of dimethylformamide (or other solvent for the polyurethane) and heating the surface (as with hot air) in a manner to partially collapse the microporous structure along the surface and form a thin fused polyurethane skin thereon; materials so finished often have a series of tiny spaced depressions, line with fused polyurethane material, at said surface.

Another suitable finishing treatment involves applying to the upper surface of the microporous material a thin top coat, such as an aqueous emulsion of a suitable polymer (e.g. an alkyl acrylate polymer or copolymer such as a copolymer of butylacrylate with some 15% of acrylonitrile and about 1–2% of itaconic acid, which can be cross-linked on heating by the inclusion of urea-formaldehyde condensation product in the emulsion, as is well known in the art); the amount of such polymer may be insufficient to close the pores, or sufficient to provide a very thin layer, less than about one micron in thickness, whereby the appearance of the material is improved without unduly decreasing its ability to transmit water vapor. In still another subsequent finishing treatment the upper surface of the sheet material is given a more or less continuous top coating of a polymer (such as a thermoplastic polyurethane) which is present in a layer so thin (e.g. 0.1 to 1 mil) that it transmits water vapor even though apparently continuous.

As stated, the invention finds its greatest utility in the treatment of unreinforced microporous polyurethane elastomer sheet material. In its broader aspects, however, the invention may be applied to microporous sheets which comprise a woven or non-woven fabric backing coated with, and usually impregnated with, microporous polyurethane elastomer material. In this case the microporous layer overlying the impregnated fabric layer is usually relatively thin, e.g. below 25 mils (0.63 mm., e.g. 0.2 to 0.4 mm.) although the total thickness of the sheet material (including the fabric body layer or reinforcement) is about the same as that of applicant's preferred unreinforced) polyurethane sheet material. In one embodiment, there may be formed on the fabric base layer a microporous layer of polyurethane material having a relatively low apparent density (e.g. a layer 0.5 mm. thick having an apparent density of 0.4 g./cm.$^3$) and this layer may be densified (and embossed and/or boarded and/or decorated) as described previously.

It is also within the broader scope of this invention to use other thermoplastic, water-insoluble and water-resistant elastomeric materials in place of all or part of the polyurethane elastomers.

The invention is most useful in making substitutes for shoe upper leather. In the manufacture of shoes, it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g., at the toe and sides.

During the fitting together of the upper, the edges of the upper leather are generally "skived," by cutting a bevel on the "flesh side" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made," 3rd ed., copyright 1966 by United Shoe Machinery Corporation.

The microporous sheets consisting essentially of microporous thermoplastic elastomeric polyurethane are particularly suitable for use as substitutes for upper leather in the manufacture of men's and women's shoes. The upper not only conforms unusually well to the last, without wrinkling or puckering, but also retains its lasted shape very well after removal from the last, particularly when the upper has been given the conventional type of heat setting treatment (e.g. setting with heat alone or moist heat) on the last. The material has very good skiving characteristics, particularly if it is wet with water prior to skiving. The shoes are comfortable and the uppers show very good wear resistance. Unlike many shoes made with the conventional fabric-reinforced leather substitutes, there is no problem of fabric show-through or orange peel on lasting.

The following examples are given to illustrate this invention more fully. In the examples all pressures are atmospheric unless otherwise indicated. In the application all proportions are by weight unless otherwise indicated.

EXAMPLE 1

The sheet material which is treated in this example is a microporous polyurethane elastomer sheet whose general cross-section is of the type shown in FIG. 2, having a thickness of 64 mils (1.6 mm.). The sheet comprises two unitary layers of different density; its less dense upper layer (which is more highly pigmented than the bottom layer) is 18 mils (0.45 mm.) thick and its upper surface has been finished by spraying it with fine droplets of dimethylformamide and blowing hot air against the sprayed surface to form a thin permeable, skin (having a thickness in the range of 1 to 15 microns) of fused polyurethane material. The overall apparent density of the sheet material (determined by weighing a rectangular sample of measured thickness, length and width and calculating the density on the basis of these measurements) is 0.44 g./cm.$^3$ and the apparent density of its upper layer is 0.32 g./cm.$^3$. Its collapse temperature is 192° C.

The sheet used in this example is produced (in the manner described in Example 11, below) onto a porous temporary support, from a paste of dissolved polyurethane containing dispersed NaCl, by casting a layer of the past onto a porous temporary support, immediately thereafter casting a second layer of a paste of the same type but having a higher salt content directly onto the first layer, then coagulating and leaching the cast material and stripping the sheet from the support. Thus the upper and lower "layers" mentioned above are integral and are not joined by any extraneous adhesive.

In carrying out the treatment of this example the material is soaked in water containing 0.2% sodium lauryl sulfate (a wetting agent) for 10 minutes and then passed three times (and at a rate of 0.89 meter per minute) through the nip between a lower rubber-covered roll and an upper heated metal roll (having a surface temperature of 115° C.) whose axis is parallel to, and directly above, the axis of the lower roll. Both rolls move at the same surface speed and, at the nip, their surfaces move in the same direction, drawing the material through the nip. The upper roll, which is 20 cm. in diameter, is pressed pneumatically downward toward the lower roll by compressed air, at a pressure of 2.1 kg./sq. cm. giving a total force of about 750 kg., at said nip, on the sheet material, which is 51 cm. wide. The metal roll is heated by internal heating tubes supplied with steam under superatmospheric pressure. Its metal surface is very finely pitted (sandblasted), the depressions in its surface being about 3 to 5 microns deep and their widths being in the range of about 5 to 40 microns; this surface produces little, if any, grain effect on the sheet material during the treatment described in this example. The rubber covering of the lower roll is made of a layer of rubbery material of 76 Shore A hardness over 15 mm. thick. The overall diameter of the rubber-covered lower roll (uncompressed) is 30.5 cm.

The overall thickness of the sheet and the thickness of the upper layer are measured after each pass, as follows:

|  | Overall thickness (mm.) | Thickness of upper layer (mils) |
|---|---|---|
| After first pass | 1.52 | 0.38 |
| After second pass | 1.50 | 0.35 |
| After third pass | 1.42 | 0.32 |

(To measure the thicknesses in this example the material is observed against a scale under a microscope at a magnification of 3×.)

The treatment considerably increases the resistance of the sheet material to scuffing at its upper surface. The treated material can be skived readily (even without a preliminary dip in water before the skiving operation). Its upper surface shows a good "break" similar to that of boarded calf leather; the "break" rating is about equal to a S.A.T.R.A. standard (PM 36) of 0.5, as compared to 1.0 before the treatment. The water vapor transmission of the treated material is 410 g./m.$^2$/24 hours, as compared to 680 g./m.$^2$/24 hours.

EXAMPLE 2

In this example there is used a sheet material similar to that used as the starting material in Example 1 and made in the same way, but the material has not been given the surface treatment with dimethylformamide described in Example 1. The collapse temperature of the starting material is 191° C.

After immersion in water containing 0.2% of sodium lauryl sulfate for ½ hour, relatively long strips of the material, of 12 in width, are passed directly, without any preheating, through the nip of the rolls described in Example 1, at a rate of about 0.89 m./min., while the pressure of the air urging down the upper roll is gradually increased. Samples cut from the resulting strips at various points along their length are examined. The following results are obtained:

|  | Temperature of surface of hot roll, ° C. | Range of air pressure, kg./cm.$^2$ | Corresponding range of thickness of— | |
|---|---|---|---|---|
|  |  |  | Upper layer (as percent of original thickness) | Lower layer (as percent of original thickness) |
| (a) | 118 | 1.75–7.4 | 63–53 | 100–93 |
| (b) | 113 | 1.4–7.7 | 79–53 | 98–93 |

It will be understood that the total force on the material at the nip is, as in Example 1, some 35.5 kg. for each kg./cm.² of air pressure.

In another series of experiments, strips 4 inches wide are used under the following conditions, with the results given below. It will be understood that the duration of treatment varies with the rate of travel of the material through the nip; the higher the rate of travel the shorter the time of treatment.

| | Temperature of surface of hot roll, °C. | Air pressure, kg./cm.² | Rate of travel through nip, in meters per minute | Thickness as percent of original thickness of— | |
|---|---|---|---|---|---|
| | | | | Upper layer | Lower layer |
| (c) | 127 | 2.3 | 3.86 | 83 | 99 |
| (d) | 127 | 2.3 | 0.89 | 50 | 87 |
| (e) | 127 | 2.3 | 7.25 | 84 | 99 |
| (f) | 113 | 2.3 | 0.89 | 68 | 90 |
| (g) | 95 | 7.0 | 0.89 | 100 | 100 |
| (h) | 110 | 2.3 | 0.89 | 100 | 99 |
| (i) | 143 | 2.3 | 7.25 | 83 | 97 |
| (j) | 101 | 7.0 | 0.89 | 89 | 97 |

FIGS. 3 and 4 show the cross-section of the upper portion of the product of experiment (d) above. In the starting material the apparent density of the upper layer is somewhat less than 0.4 g. cm./cm.³, while the density of the pigmented polyurethane of which it is composed is about 1.2 g./cm.³. Thus the original upper layer is about ¼ to ⅓ polyurethane and if it were collapsed so as to be completely non-porous its thickness would be the same fraction (i.e. about ¼ to ⅓) of the original thickness.

In experiment (e) above, in which the speed is high and the time of treatment low the compression occurs primarily in the very top portion of the upper layer. The treatment here gives the product a more even and more matte appearance, and greatly reduces streakiness.

Soaking the starting sheet material for about one hour in boiling water containing the wetting agent appears to have no effect on the density of either of the layers.

EXAMPLE 3

In this example a sheet of implemented single layer microporous elastomeric polyurethane, about 45–50 mils (about 1.2 mm.) in thickness, having a density of about 0.41 g./cm.³ and having a smooth upper surface, is used. colored aqueous medium is applied to certain portions of the surface of the sheet and the sheet is then passed through the nip of the rolleres described in Examples 1 and 2.

The surface of the heated metal roll carries a grain pattern ("Morimer grain"). More specifically the entire right cylindrical outer surface of the roll has small irregularly shaped scalloped or polyhedral hollows which are on the order of 1 mm. across, and whose depths are in the range of about 20 to 80 microns, while the undepressed portion of the surface of the roll has protuberances (more or less spherical or wart-like) about 166 microns wide; the boundaries of the hollows are very thin (less than 0.1 mm. in width) and form a continuous network over the entire surface of the roll, which network is within the surface of an imaginary right circular cylinder coaxial with said roll; in other words there is a "raised" network of thin lines, all the spaces between the lines being scooped out to form shallow hollows. It will be apparent that the depth of the grain on the roll is insignificant in comparison with the thickness of the compressible microporous sheet (here it is well below 3%, and specifically less than 1% of the thickness of the sheet) and that the compacting pressure on the sheet is substantially uniform, while the grain on the roll has an insignificant effect on the uniformity of the compacting pressure exerted on the sheet. There is, of course, across the sheet a small but continuous variation in compacting pressure (due to the well known fact that the deflection of the rolls under pressure is greater at the ends, which are closer to the bearings); for practical purposes, however, the compacting pressure is substantially uniform.

The hot roll is heated with steam at 0.7 kg./cm.² which other tests have shown to give a roll surface temperature of about 113° C. The downward pressure on the heated roll is exerted by air at 1.75 kg./cm.². The strip of microporous material passing through the nip is about 10 cm. wide and the rolls are set to move at a surface speed of 0.89 meter per minute.

Drops of various 1–5% aqueous solutions of various water soluble dyes are applied to the smooth upper surface of the untreated strip of microporous material and the strip is then held vertically for a short time so that the dye solutions run down the strip in snaky lines of gradually decreasing width. This takes at most 5 to 10 seconds. The strip is then directly passed through the nip of the rolls, described above. The sheet is found to be embossed in snakelike patterns corresponding to the paths of the drops. In addition within these paths the surface of the sheet has a distinct Morimer grain corresponding to (but, of course, being the negative of) the scooped-out surface of the metal roll. The depth of embossing varies along the paths of drops. The colors penetrate to the bottom (back side) of the microporous sheet, but no embossing effect is visible there. The paths of the drops criss-cross each, giving interesting colour effects at the intersections. The dyes used are American Cyanamid's Calcomine Black Ex and Calcomine Red 8B and Calcomine Blue 31, Du Pont's Pontamine Fast Yellow RL and Sandoz's Acetosol Brown GLS Pat.

EXAMPLE 4

In this example there is used a sheet material like that used in Example 2, having a collapse temperature of 191° C.

Water, containing 0.2% sodium lauryl sulfate, is applied to the top surface of the material in a pattern of two crossed bands each 1 cm. wide, so that the material is wet at said bands while the rest of the sheet on either side of each band is substantially dry. The material is then placed with its upper surface against a flat heated grained metal plate (whose surface carries a grain pattern like that described in Example 3) and is pressed against the hot plate, having a temperature of 89° C. with a pressure of 0.35 kg./cm.² for 5 minutes and then removed. The pressure is applied by means of a flat metal plate (at room temperature) pressing against the lower surface of the sheet. The portion of the upper surface that had been wetted is found to be embossed with a pronounced deep grain whereas there is very little grain evident on the unwetted portion of the surface of the sheet despite the fact that a substantially uniform compacting pressure is exerted on both the wetted and unwetted areas of the sheet. The lower surface of the sheet substantially retains its original relatively rough somewhat fibrous appearance and feel; this surface characteristic results from this having been coagulated in contact with and having been stripped from, the porous temporary support.

EXAMPLE 5

A microporous sheet having a densified upper surface is produced by passing a sheet of the kind described in Example 2 which has been thoroughly soaked in water (containing 0.2% sodium lauryl sulfate) between rolls operated in accordance with Example 1. Then the still hot and wet sheet is doubled over, with its upper surface inside, and pressure is exerted at and near the fold line while the fold line is moved back and forth along the length of the material (in the same manner as is used for "boarding" natural leather to produce a boarded or willow grain). The hot wet material is then folded crosswise to the original fold and similarly boarded in the crosswise direction after which the same procedure is twice repeated, along folds which are diagonal to the first two folds. The resulting material has a very fine grain at its surface, the grain being similar to that of fine board calfskin. When the same process is repeated except that the material is allowed to cool after passing under the heated roll the fine grain disappears after several hours at room temperature.

By using the process of the present invention and boarding, one can obtain a grained material, having an appreciably higher water vapor transmission than can be obtained when the grain is produced by dry embossing.

EXAMPLE 6

In this example the starting material is a microporous two-layer black-pigmented sheet material, as in Example 1, but the material has not been given the surface treatment with dimethylformamide described in that example. The sheet material is 1.9 mm. thick and 46 cm. wide. It is soaked overnight in water containing 0.2% sodium lauryl sulfate and then passed through the nip of the rolls described in Example 1. Before passing through the nip the sheet, moving with the roll at a speed of 0.89 m./min., makes a 270° wrap around the hot metal roll which is at a temperature of 107° C. The total force at the nip is about 750 kg. The hot wet material is then "boarded" as in Example 5, in four directions. After cooling and drying its upper surface is sprayed with fine droplets of dimethylformamide while hot air is blown against the sprayed surface; it is found that only about one-half as much dimethylformamide is needed to secure the same brightness and intensity of color as is required for the same sheet material which has not been treated as in this example. The grained product has good water vapor transmission, when compared to a product having a surface grain of similar appearance produced by dry embossing the same sheet material with a heated grained roll. It has good flex life and abrasion resistance and excellent esthetic qualities, and behaves very well when used in place of the upper leather in shoe making operations, yielding shoes of smooth, excellent appearance closely resembling shoes whose uppers are of high quality boarded calif.

EXAMPLE 7

In this example the starting material is the same two-layer microporous sheet material as is used as the starting material in Example 2. The construction and arrangement of the rolls is the same except that the heated metal roll has small spaced raised elongated ridges projecting about 85–105 microns from the surface of the roll, to emboss the sheet material to give the effect of a kid grain. These ridges at their bases are about 300–900 microns long and some 200–300 microns wide; their cross-sections are somewhat tear-shaped, being wider at the base than at the outermost portion.

The sheet material is soaked overnight in water containing a small amount of a wetting agent (e.g. 0.2% of sodium lauryl sulfate) and then given two passes between the rolls. In the first pass excess water is equeezed out of the material (the water:polymer weight ratio before the squeezing being about 1.32:1 and after the squeezing being about 0.32:1) and the temperature of the wet material is raised. The material is then directly passed through the nip of the rolls a second time. A fine deep embossed pattern is produced; FIG. 1 illustrates a cross-section at and near the embossed surface, which runs diagonally upward to the upper right-hand corner in this photomicrograph. In both passes the following conditions are used and, as in Example 3, the compacting pressure is substantially uniform across substantially the entire area of the sheet: Steam supplied to interior of hot roll: 0.7–0.8 kg./cm.$^2$ (which ordinarily gives a surface temperature of 116° C.). Pressure of air used to urge top roll downward: 6.3 kg./cm.$^2$. Width of material passing between rolls: 43 cm. Surface speed of rolls: 0.89 meter per min. Similar results are obtained when the hot roll used for the first pass through the nip is grainless (e.g. smooth with a matte or sanded finish).

EXAMPLE 8

In this example the starting material is a sheet of microporous elastomeric polyurethane having a thickness of 0.78 mm. having the structure shown in FIG. 5, and made of a lower melting polyurethane, such that the collapse temperature of the microporous product is about 155° C. The intrinsic viscosity of the polyurethane (measured in tetrahydrofuran) is about 0.8.

The treatment procedure is the same as that in Example 7 except that the surface temperature of the hot roll is lowered to 88° C. A sharply embossed material is produced; the grain is much more pronounced than when the same treatment is supplied to dry material.

A typical general procedure for making the starting material used in this example is as follows: Polyesterurethane having a molecular weight of about 60,000 is prepared following the procedure set forth in U.S. Pat. 2,871,218, col. 4, lines 13 to 27. A mixture of 1447 g. (1.704 mols) of hydroxyl poly(tetramethylene adipate) [molecular weight 849, hydroxyl number 130.4, acid number 0.89], and 109.6 g. (1.218 mols) of butanediol-1,4 is melted in a four liter kettle and stirred with a spiral ruibbon stirrer for about 20 minutes at a pressure of 5 to 6 mm. at 200 to 110° C. To this mixture, there is added 730 g. (2.92 mols) of dihpenyl methane-p,p'-diisocyanate. This mixture is stirred for about 1 minute and is then poured into a lubricated one gallon can which is promptly sealed with a friction top and the can placed in a 140° C. oven for 3.5 hours. The product is then cooled. A 20% solution of the polyesterurethane is tetrahydrofuran is prepared.

Then 79.8 kg. of the solution is heated to 62° C. and maintained at 62–73° C. while 43.3 kg. of 1-hexanol is added slowly. The solution is clear. The solution is then slowly cooled over a 22 minute period until opalescence appears at 47° C. The opalescent composition is then cooled another 7 minutes to 43° C. and cast, over a period of 3 minutes, at a thickness of about 2.0 mm. onto the surface of a temporary support, such as a polyester/cotton woven percale sheet having a weight of 0.006 gram per square cm. The material is air-dried for a period of 6 hours at temperatures increasing up to 120° C. to remove the solvent and nonsolvent. After being cooled, the microporous polyurethane is thne stripped from the polyester/cotton sheet.

EXAMPLE 9

To 20.7 kg. of N,N-dimethylformamide ("DMF") in a 10 gal. reactor are added 4423.8 g. Desmophen 2001 polyester (a hydroxyl-terminated polyester of 2000 molecular weight made from 1 mol butanediol-1,4, 1.13 mols ethylene glycol and 2 mols adipic acid), 900.61 g. 1,4-butanediol, 0.5148 g. methanol, 2.154 g. trimethylolpropane (the amounts of monofunctional methanol and trifunctional trimethylolpropane being such as to give an average functionality of two), 0.04127 g. p-toluenesulfonic acid, 3.536 g. dibutyl tin dilaurate and 3514.42 g. diphenylmethane-p,p'-diisocyanate. The solution is stirred at 120° F. for 2½ hours, the unreacted isocyanate content determined by titration, then an amount of 1,4-butanediol to provide one alcoholic hydroxyl for each unreacted isocyanate group is added. The viscosity of the solution increases over a 6 hour period of 1450 poises (Brookfield), at which point 160 g. of a 40/60 methanol/DMF solution is added to stop the reaction. The final solution viscosity is 2100 poises; the final intrinsic viscosity is 1.115.

Into 427 g. of micropulverized sodium chloride (average particle size 10 microns, maximum particle size 52 microns) contained in a one gallon, two-arm kneader is mixed 800 g. of the above polyurethane solution. After being mixed for 65 minutes, the mixture is passed twice through a three roll mill, degassed at 4 mm. Hg for about 30 minutes, spread between 3.25 mm. shims onto a porous temporary support (a sintered polyethylene sheet treated with "Duponol MF" surfactant), and immediately placed in a convection oven maintained at 38° C. for 10 hours to coagulate the polymer by evaporating off the DMF. The sheet is then immersed in a bath of water maintained at 57° C. for 6 hours to leach out the salt, dried and removed from the temporary support.

A 4 cm. wide sample of the resulting sheet is wetted (with water containing 2% sodium lauryl sulfate) over one-half its width, while the other half is left dry. The sample is passed lengthwise at a rate of 0.89 m./min. through the nip of the rollers described in Example 3, with the "Morimer" grain roll heated to a surface temperature of 149° C., using an air pressure of 2.8 kg./cm.$^2$. The wetted area of the sheet has a grain which is considerably deeper (about 0.02 mm. deeper) than the very shallow grain which appears on the area which is not wetted.

EXAMPLE 10

Another suitable polyurethane, which may be employed in place of the polyurethane described in the preceding examples, may be prepared by using polycaprolactone ("Niax D560") of 2029 average molecular weight in place of the glycol adipate. The polycaprolactone has alcoholic hydroxyl groups at both ends, having been made by initiating the polymerization of the epsinoncaprolactone in the presence of butanediol-1,4; its acid number is 1 or less.

EXAMPLE 11

The sheet of Example 1 is produced in the general manner described herein.

A solution of thermoplastic elastomeric polyurethane is prepared as follows: To 39.5 kg. of N,N-dimethylformamide ("DMF") in a 20 gal. reactor are added 8553 g. Desmophen 2001 polyester, 1767 g. 1,4-butanediol, 6.80 g. dibutyl tin dilaurate and 668 g. diphenylmethane-p,p'-diisocyanate. The solution is stirred at 120° F. for 2½ hours, the unreacted isocyanate content determined by titration; then an amount of 1,4-butenediol to provide one alcoholic hydroxyl for each unreacted isocyanate group is added. The viscosity of the solution increases over a 3.4 hour period of 3600 poises (Brookfield), at which point 305 g. of a 50/50 methanol/DMF solution is added to stop the reaction. The final solution viscosity is 2400 poises; the final intrinsic viscosity is 1.00.

A pigment master batch is formed by thoroughly mixing 38.8 kg. of the 30% polyurethane solution, 33.2 kg. DMF and 8.0 kg. carbon black (Rajah Black), and milling. Stabilizers against oxidation, ultraviolet and hydrolysis may be present.

Two homogeneous pigmented dispersions are prepared. One paste which will be used for the base layer and is hereafter termed the "substrate paste" has the following composition:

41.3 kg. of the 30% polyurethane solution, 1.24 kg. DMF, 0.64 kg. of the pigment master batch and 22.8 kg. of ground sodium chloride (13 micron average particle diameter).

The other paste (which will be used for the upper layer and will hereafter be termed the "upper layer peaste") has the following composition: 31.5 kg. of the 30% polyurethane solution, 7.52 kg. DMF, 5.7 kg. of the pigment master batch and 31.6 kg. of the same ground sodium chloride.

The substrate paste is cast onto a porous temporary support under a doctor blade spaced about 2.7 mm. above the support and the upper layer paste is cast directly thereon, under a doctor blade spaced about 3.4 mm. above the same support. The backer carrying the two layers, is immersed upside down (the upper layer being now lowermost) in a bath of water (maintained e.g. at 20 or 30° C. for a period of 1 to 3 hours or more) to coagulate the material and then through mangles in a series of leaching tanks containing water at 60° C. for 4 hours or more to leach out the sodium chloride, after which it is thoroughly dried in an oven supplied with heated air at a temperature of 120° C. It is then stripped from the temporary support.

EXAMPLE 12

In this example the water, containing 0.1% sodium lauryl sulfate, is applied in a pattern on the surface of the sheet material of Example 2 by laying onto the upper surface of the sheet a water-wet loosely woven( or loosely knitted) scrim of non-absorbent fiber (e.g.-nylon-6, or of water absorbent fiber such as cotton) and running the resulting assembly between the rolls of Example 2 using an ungrained hot metal roll. The resulting product (after removal of the scrim) has an embossed grain corresponding to the configuration of the open weave of the scrim.

The "collapse temperature," mentioned above, can be conveniently determined by placing a dry sample of the microporous thermoplastic material in a convection oven and noting the temperature at which a translucent nonporous structure is formed (e.g. in a 10 minute period).

With respect to the structure of the type of microporous sheet which it is preferred to use as the starting material in the process of this invention, photomicrographs (e.g. FIG. 2) indicate that the volume of the sheet is largely taken up by cavities of generally rounded or compact (not highly elongated) shape, whose maximum dimensions are in the range of about 10 to 45 microns, connected by smaller passageways. It will be appreciated that in any cross-sectional slice some cavities will be cut along a diametral plane (so that their full diameter will be apparent) while others will be cut on one side or the other of a diametral plane (so that the apparent diameter of such cavities on the photograph may be considerably less than their actual diameters). After the process, the cavities near the face of the material which has been pressed against the hot surface are distorted, being elongated in a direction generally parallel to that face, or are wholly or partially collapsed, as is apparent from FIGS. 1, 3 and 4.

While the side of the wet sheet in contact with the hot surface becomes compacted in the foregoing examples, no evidence of substantial compaction or other physical change on the opposite side of the sheet has been observed.

In the foregoing examples after the step of pressing the wet sheet against the hot surface the sheet is allowed to dry in air in the atmosphere at room tempearture. It will be understood that it may instead be passed through a drying oven, or other suitable techniques for removal of the moisture may be used.

The temporary support used in the above examples is, typically, a sheet of porous synthetic plastics material formed by spreading an even layer of Ziegler high density polyethylene powder on a smooth metal surface and then placing the smooth metal surface and the layer in a suitable heated oven to cause the particles to sinter. The surface of the resultant sintered sheet which was in contact with the smooth metal surface is smoother than the other face and it is on this smoother face that the layer is formed. A typical temporary support is 1.7±0.1 mm. thick and has a permeability of 5.5 cubic meters of air per minute at 20,000 dynes per square centimeter pressure.

The preferred thermoplastic elastomeric polyurethanes are understood to have few, if any, chemical cross links and are believed to derive their properties primarily from hydrogen bonding forces rather than cross linkages. Their stress-strain curves are of the same general shape as those shown in FIG. 1 of the article by Stetz and Smith in Rubber Age, May 1965, p. 74. While the polyurethane itself usually shows a tension set below 100%, as previously discussed, the preferred microporous polyurethane sheets generally recover completely with substantially no permanent set (under standard dry conditions at room temperature) after being stretched 100%.

All measurements referred to herein are made at room temperature (e.g. 23° C.) unless the test method specifies otherwise.

In the examples the hot surface is of metal (e.g. steel). Other surfaces may be used, e.g. steel uniformly coated with a thin layer of a water-repellant material such as polytetrafluoroethylene or other fluorocarbon polymer or a silicone.

One advantage of the process of this invention is that it makes it possible to emboss the microporous sheet much more rapidly and with less expensive equipment than is required when the sheet is not wet with water. The contact time with the hot surface can be much lower and the size of the grained or other embossing element can accordingly be made much smaller for similar speeds of travel of the sheet; thus for many operations there is no need for using large embossing drums, which often have seams which give undesired effects or are difficult to remove. Furthermore, by the process of this invention new and highly useful products of unique structure have been obtained.

It is understood that the foregoing detailed description is given merely by way of illustration and that variations may be made therein without departing from the spirit of the invention. The "abstract" given above is merely for the convenience of technical searchers and is not to be given any weight with respect to the scope of the invention.

What is claimed is:

1. Process for treatment of a sheet having at least a layer of water-insoluble water-resistant microporous organic polymeric thermoplastic elastomeric polyurethane material at a face thereof, which comprises increasing the dry density of said microporous material by applying a compacting pressure across substantially the entire area of said sheet to press said face against a hot surface while said microporous material is wet with water, said hot surface being at a temperature below the collapse temperature of the microporous material and within 102° C. of said collapse temperature, removing said compacting pressure and then removing moisture from said sheet, the micropores of said microporous layer being invisible to the naked eye of a person with 20/20 vision.

2. Process as in claim 1 in which the time of exposure to said heat and pressure is below 3 seconds.

3. Process as in claim 2 in which said microporous material is elastomeric, is substantially free of macropores, has a density of at least 0.3 grams per cubic centimeter, and has the property of collapsing to form a nonporous structure when heated in dry condition in an oven at said collapse temperature, said micropores being invisible to the naked eye of a person with 20/20 vision, said process effecting a permanent compaction of said microporous material to a greater extent than as otherwise identical process in which said microporous material is not wet.

4. Process as in claim 1 in which the said layer consists essentially of microporous non-fibrous elastomeric polyurethane material having a thickness of at least about 0.2 mm.

5. Process as in claim 3 in which said layer consists essentially of microporous non-fibrous thermoplastic polyurethane material having a thickness of about 0.63 to 2.5 mm. and a density of about 0.35 to 0.65 gram per cubic centimeter.

6. Process as in claim 5 in which said sheet is of unitary microporous polyurethane material whose extensibility is unconstrained by the presence of fibrous fabric.

7. Process as in claim 3 in which said hot face is at a temperature which is at least about 20° C. below the collapse temperature of the microporous material.

8. Process as in claim 3 in which the microporous material is wet throughout its thickness in water.

9. Process as in claim 3 in which the entire area of the microporous material at said face is wet with water.

10. Process as in claim 3 in which the heated surface is substantially unpatterned.

11. Process as in claim 9 in which said heated surface is patterned, having raised portions or depressions whereby a relief pattern is imparted to said microporous material.

12. Process as in claim 11 in which the heights or depths of the raised portions or depressions are less than 3% of the thickness of said microporous sheet.

13. Process as in claim 3 in which only portions of the entire area of the microporous material at said face are wet with water whereby said microporous material becomes preferentially densified at said wet portions.

14. Process as in claim 13 in which the water carries a dye or pigment.

15. Process as in claim 3 including the step of preheating the water-wet material prior to said densifying compression.

16. Process as in claim 15 in which the water-wet material is placed in contact with said hot surface to preheat said material and the preheated material is then pressed against said hot surface.

17. Process as in claim 3 in which said sheet is saturated with water, then squeezed to remove excess water, and then pressed against said hot face.

18. Process as in claim 6 in which said microporous sheet has a plurality of integral layers, the layer at said face being of lower density than the layer below it, said lower density layer having a thickness of 0.2 to 0.5 mm. and a density below 0.45.

19. Process as in claim 18 in which the entire microporous material is wet with water and in which the heated surface is substantially unpatterned whereby said microporous material is substantially uniformly compressed across its whole area.

20. Process as in claim 6 in which said polyurethane is a chain-extended reaction product of (a) a soft polyester in which the

groups are separated by aliphatic chains averaging about 3 to 6 carbon atoms in length, said polyester having a molecular weight within the range of 800 to 6000 and (b) diphenylmethane-p,p'-diisocyanate.

21. Process as in claim 20 in which said polyurethane remains soluble in dimethylformamide after said pressing.

22. Process as in claim 6 in which said sheet before pressing comprises compact cavities of about 20 to 45 microns in maximum dimension connected by passages of smaller diameter and separated by walls of about 1 to 10 microns in thickness.

23. Process as in claim 22 in which said polyurethane material has a melting point above 150° C. and a yield point at about 5 to 20% elongation and a percent elongation at break of at least 300%.

24. Process as in claim 6 in which said polyurethane material has a melting point above 150° C. and a yield point at about 5 to 20% elongation and a percent elongation at break of at least 300%.

References Cited

UNITED STATES PATENTS

| | | | |
|---|---|---|---|
| 3,238,055 | 3/1966 | Brightwell | 264—41 UX |
| 3,565,981 | 2/1971 | Lauro | 264—41 X |
| 3,520,767 | 7/1970 | Manwaring | 161—Dig. 2 |
| 3,584,110 | 6/1971 | Blaszkov | 264—321 X |
| 3,590,112 | 6/1971 | Cirardi | 264—321 |
| 3,406,235 | 10/1968 | Trogdon | 264—321 |
| 3,454,413 | 7/1969 | Miller | 269—321 X |
| 2,933,767 | 4/1960 | Vieli | 264—321 X |
| 3,473,957 | 10/1969 | Porrmann | 260—2.5 Y |
| 2,697,048 | 12/1954 | Secrist | 260—2.5 Y X |
| 3,348,963 | 10/1967 | Fukushima | 260—2.5 A Y |
| 3,170,974 | 2/1965 | Jacobs | 264—321 X |
| 3,386,877 | 6/1968 | Skochdopole | 264—321 X |
| 3,370,117 | 2/1968 | Blue | 264—321 |
| 3,443,007 | 5/1969 | Hardy | 264—321 |
| 3,190,765 | 6/1965 | Yaun | 260—2.5 A X |
| 3,104,192 | 9/1963 | Hacklander | 264—48 |

PHILIP E. ANDERSON, Primary Examiner

U.S. Cl. X.R.

161—161, 164, 166, Dig. 2; 260—2.5 AY; 264—41